United States Patent
Ishii et al.

(10) Patent No.: US 12,045,620 B2
(45) Date of Patent: Jul. 23, 2024

(54) MOVE ELIMINATION

(71) Applicant: Arm Limited, Cambridge (GB)

(72) Inventors: Yasuo Ishii, Austin, TX (US);
Muhammad Umar Farooq, Austin, TX (US); William Elton Burky, Austin, TX (US); Michael Brian Schinzler, Round Rock, TX (US); Jason Lee Setter, Austin, TX (US); David Gum Lim, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/554,573

(22) Filed: Dec. 17, 2021

(65) Prior Publication Data

US 2023/0195466 A1 Jun. 22, 2023

(51) Int. Cl.
*G06F 9/30* (2018.01)
*G06F 9/38* (2018.01)

(52) U.S. Cl.
CPC ............ *G06F 9/384* (2013.01); *G06F 9/3867* (2013.01)

(58) Field of Classification Search
CPC ............................... G06F 9/384; G06F 9/3867
See application file for complete search history.

(56) References Cited

U.S. PATENT DOCUMENTS

| | | | | |
|---|---|---|---|---|
| 2009/0327661 A1* | 12/2009 | Sperber | ................... | G06F 9/384 712/217 |
| 2014/0095838 A1* | 4/2014 | Kadgi | ................. | G06F 9/30181 712/220 |
| 2015/0277911 A1* | 10/2015 | Khartikov | ............. | G06F 9/3855 712/225 |
| 2018/0052613 A1* | 2/2018 | McDaniel | ............. | G06F 9/3834 |
| 2021/0303308 A1* | 9/2021 | Smith | ..................... | G06F 9/384 |

* cited by examiner

*Primary Examiner* — Corey S Faherty
(74) *Attorney, Agent, or Firm* — NIXON & VANDERHYE P.C.

(57) ABSTRACT

A data processing apparatus is provided that comprises rename circuitry for performing a register rename stage of a pipeline in respect of a stream of operations. Move elimination circuitry performs a move elimination operation on the stream of operations in which a move operation is eliminated and the register rename stage performs an adjustment of an identity of registers in the stream of operations to compensate for the move operation being eliminated and demotion circuitry reverses or inhibits the adjustment in response to one or more conditions being met.

8 Claims, 6 Drawing Sheets

MOVE ELIMINATION

TECHNICAL FIELD

The present disclosure relates to data processing.

DESCRIPTION

Move elimination is a technique in which the rename stage of a processor pipeline can be used to essentially 'eliminate' a move instruction in a stream of instructions. This can be achieved by copying a physical register number from one entry in a renaming table to another.

SUMMARY

Viewed from a first example configuration, there is provided a data processing apparatus comprising: rename circuitry configured to perform a register rename stage of a pipeline in respect of a stream of operations; move elimination circuitry configured to perform a move elimination operation on the stream of operations in which a move operation is eliminated and the register rename stage performs an adjustment of an identity of registers in the stream of operations to compensate for the move operation being eliminated; and demotion circuitry configured to reverse or inhibit the adjustment in response to one or more conditions being met.

Viewed from a second example configuration, there is provided a data processing method comprising: performing a register rename stage of a pipeline in respect of a stream of operations; performing a move elimination operation on the stream of operations in which a move operation is eliminated and the register rename stage performs an adjustment of an identity of registers in the stream of operations to compensate for the move operation being eliminated; and reversing or inhibiting the adjustment in response to one or more conditions being met.

Viewed from a third example configuration, there is provided a non-transitory computer-readable medium to store computer-readable code for fabrication of a data processing apparatus comprising: rename circuitry configured to perform a register rename stage of a pipeline in respect of a stream of operations; move elimination circuitry configured to perform a move elimination operation on the stream of operations in which a move operation is eliminated and the register rename stage performs an adjustment of an identity of registers in the stream of operations to compensate for the move operation being eliminated; and demotion circuitry configured to reverse or inhibit the adjustment in response to one or more conditions being met.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: rename circuitry configured to perform a register rename stage of a pipeline in respect of a stream of operations; move elimination circuitry configured to perform a move elimination operation on the stream of operations in which a move operation is eliminated and the register rename stage performs an adjustment of an identity of registers in the stream of operations to compensate for the move operation being eliminated; and demotion circuitry configured to reverse or inhibit the adjustment in response to one or more conditions being met.

For the avoidance of doubt, it will be appreciated that a move operation causes the contents of a source register to be copied to a destination register. Move elimination can help in reducing power consumption and the general throughput of operations through the pipeline. However, the use of the rename circuitry to eliminate move operations can increase the complexity of the register renaming and can lead to an increase in resource usage. For example, the number of entries in a Rename Commit Queue (RCQ) may be increased and infrastructure may have to be present in order to perform reference counting on the number of references to each register. Because of this increased resource usage, it is sometimes desirable to undo or demote the move elimination thereby freeing up resources in the RCQ. The elimination of the move operations from the stream of operations means that those operations do not progress through the pipeline. Instead, the effect of the move is achieved by the renaming of registers in the rename stage. The undoing or demoting of the move elimination can take place either by reversing the register renaming changes that take place or by inhibiting them from being scheduled to take place altogether. Note that there is no necessary default behaviour regarding the application of move elimination. In some examples, the default might be that move elimination is performed unless conditions are met whereas in other examples, the default behaviour might be that move elimination is not performed unless conditions are met. Although a number of conditions are described below, it will be appreciated that these are not intended to imply any kind of default behaviour. Where it is stated that move elimination is suppressed based on a particular condition, this is exactly equal to allowing move elimination based on the inverse of that condition.

In some examples, the demotion circuitry is further configured to restore the move operation in response to the one or more conditions being met. For example, one way of performing a move operation is by performing an addition (of 0) to be performed on the contents of the source register, with the result being stored in the destination register. Consequently, when the move operation is restored, an addition (of 0) operation can be scheduled. There are of course other ways of performing moves. For instance, in some architectures, a dedicated register moving execution unit could be provided. In these examples, dedicated move operations could be inserted into the stream. Note that there is no obligation for exactly the same instruction to be used for the restoration of the move operation to take place. In particular, if a move operation had initially been implemented using an addition (of 0) operation, which was then eliminated, the move instruction could be restored using a dedicated register move operation (if the architecture has such capability). It is therefore possible to restore the move operation by providing an operation that is architecturally valid (according to the specification of the underlying architecture) for performing a move operation.

In some examples, at least one of the one or more conditions relates to a capacity of a Rename Commit Queue. A Rename Commit Queue is a structure used to assist with renaming in which it is indicated, for each operation, how logical/physical registers are used (allocated or freed). For instance, one entry in the RCQ might indicate that for a particular operation, a physical register is allocated, duplicated, or freed from logical registers. The RCQ is used, among other things, to enable a rewind to take place in the event of a flush. Since move elimination results in more logical register allocations, more entries in the RCQ are used up. The RCQ is therefore a limiting factor in the extent to which move elimination can be achieved without the pipeline stalling. Consequently, by inhibiting or reversing move elimination based on the capacity of the RCQ (e.g. when the capacity is low or would be exceeded), pipeline stalls can be reduced or even prevented.

In some examples, the capacity is a current remaining capacity of the Rename Commit Queue. For instance, the number of empty entries that presently exist within the RCQ might dictate when the demotion circuitry operates.

In some examples, the data processing apparatus comprises: decode circuitry configured to decode a stream of instructions to produce the stream of operations that correspond to the stream of instructions, wherein the demotion circuitry is configured to inhibit the adjustment in response to the decode circuitry decoding a particular instruction into one or more particular operations including the move operation. The demotion circuitry can operate at the time of an instruction being decoded. For instance, if the RCQ is already at a predetermined capacity (e.g. 90% capacity), then the demotion circuitry can prevent the move elimination from taking place in the first place.

In some examples, the at least one of the one or more conditions is that the one or more particular operations would cause the capacity of the Rename Commit Queue to be exceeded when the move operation is eliminated. For instance, if the decoding of an instruction would cause a move operation to be generated, and if the elimination of that move operation would generate an RCQ entry where the RCQ is already full, then the move elimination may be suppressed by the demotion circuitry.

In some examples, the particular instruction is a blockcode instruction comprising a plurality of further instructions in an encoded form. One instruction might represent a number of operations (or even a number of instructions each of which translates to one or more operations). Furthermore, each operation might relate to a number of different registers, thereby requiring a large number of entries to be inserted into the RCQ. If the capacity of the RCQ is already limited, then instructions of this kind of nature, that wish to insert a large number of entries into the RCQ, can cause pipeline stalls to occur if move elimination is enforced. Consequently, the suppression or reversal of move eliminations cause enable the pipeline to continue flowing. A blockcode instruction could be a vector instruction such as a vector move instruction for instance.

In some examples, the data processing apparatus comprises: storage circuitry to store a latency-improvement flag to indicate a desire for latency of the pipeline to be reduced, wherein at least one of the one or more conditions is that the latency improvement flag is set to indicate the desire for latency of the pipeline to be reduced. In some situations, it may be desirable to maintain a low execution latency by forcing move elimination to take place. In these situations, a latency-improvement flag can be set (e.g. in a special register) in order to indicate that move elimination should continue to take place. In some examples, the setting of this flag overrides other conditions on which the demotion circuitry operates. For instance, if the conditions for move elimination demotion are met, then the setting of the latency-improvement flag to indicate that pipeline latency should be reduced (or remain low) means that move elimination continues (e.g. is not suppressed or inhibited).

In some examples, the data processing apparatus comprises: count circuitry to determine an Instructions Per Cycle of the pipeline, wherein at least one of the one or more conditions is that the Instructions Per Cycle is above a threshold. The Instructions Per Cycle (IPC) of a pipeline can be thought of as an average number of instructions (taken over a period of time) that pass through the pipeline within one cycle of the processor. Generally, it is considered to be desirable to maintain a high IPC in order to maintain efficiency of the overall system. One of the conditions for the demotion of move elimination to take place is that the IPC is above a particular threshold. That is, if the IPC is low then the usage of the RCQ is likely to be low (and indeed, there might be a desire for the number of instructions executed per cycle to be increased) then the suppression or inhibition of move elimination can be stopped (move elimination is encouraged) in order to reduce instruction latency and thereby bring the IPC up.

Particular embodiments will now be described with reference to the figures.

Figure 1:
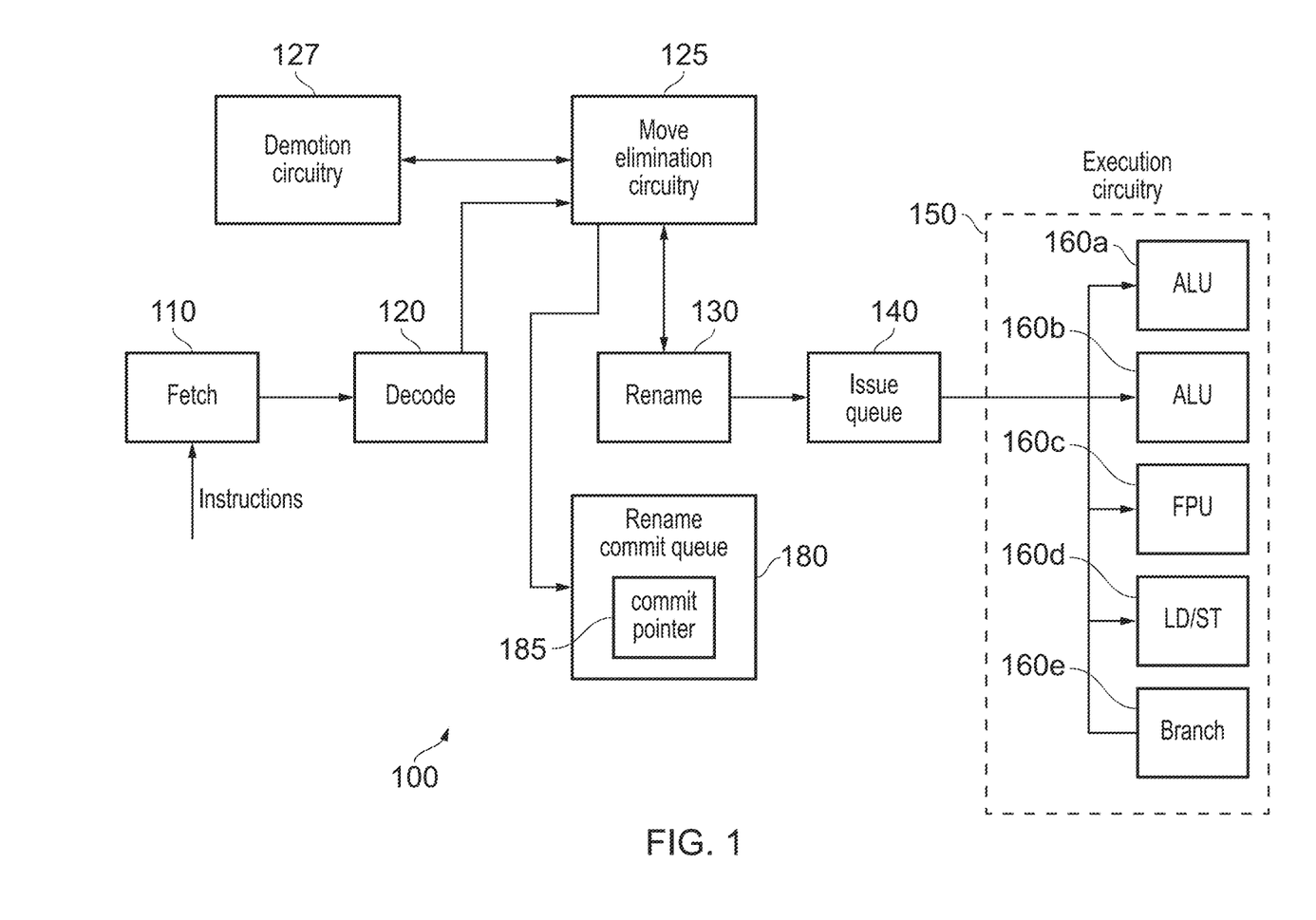
FIG. 1 schematically illustrates an example of a data processing apparatus.

FIG. 1 schematically illustrates a data processing apparatus 100. The data processing apparatus 100 includes fetch circuitry 110, which is responsible for fetching instructions from memory (either from a main memory or from a memory via a cache). The retrieved instructions are passed to decode circuitry 120 that generates one or more operations in response to instructions. Move elimination circuitry 125 is provided in order to eliminate move (MOV) operations (i.e. instructions) using the rename circuitry 130. This will be discussed in more detail below. From here, the operations are passed to a commit queue 180. The commit queue keeps track of the order in which the instructions are received so that if they are executed in a different order, they are committed (e.g. the execution is completed) in the same order that the instructions are received in, thereby providing data integrity. At the same time, the operations corresponding to the instructions are passed to rename circuitry 130 where register renaming takes place. Register renaming can incorporate a number of different techniques but generally enables the idea of 'logical registers' that map to real physical registers to enable the removal of false dependencies between instructions. Register renaming also allows for move elimination as will be detailed below. Issue circuitry 140 is provided to issue the operations to execution circuitry 150. The execution circuitry may be made up of a number of execution units such as an arithmetic logic unit (ALU) 160a, a second ALU 160b, which is provided to enable multiple arithmetic operations to take place simultaneously, a floating point unit (FPU) 160c, a load/store unit 160d, and a branch unit 160e. Other examples of execution units will be known to the skilled person. These execution units receive the operations and perform one or more functions based on those operations. When the operations are completed, they are committed with reference to the commit queue 180 so that even if the instructions are executed out-of-order, they are committed in the order in which they appear from the decode circuitry. A commit pointer 185 is provided in the commit queue 180 to track the next instruction that is to be committed. This pointer is incremented each time an instruction in the commit queue is committed.

These examples additionally use demotion circuitry 127, which can be used to reverse or inhibit move elimination from taking place.

Figure 2:
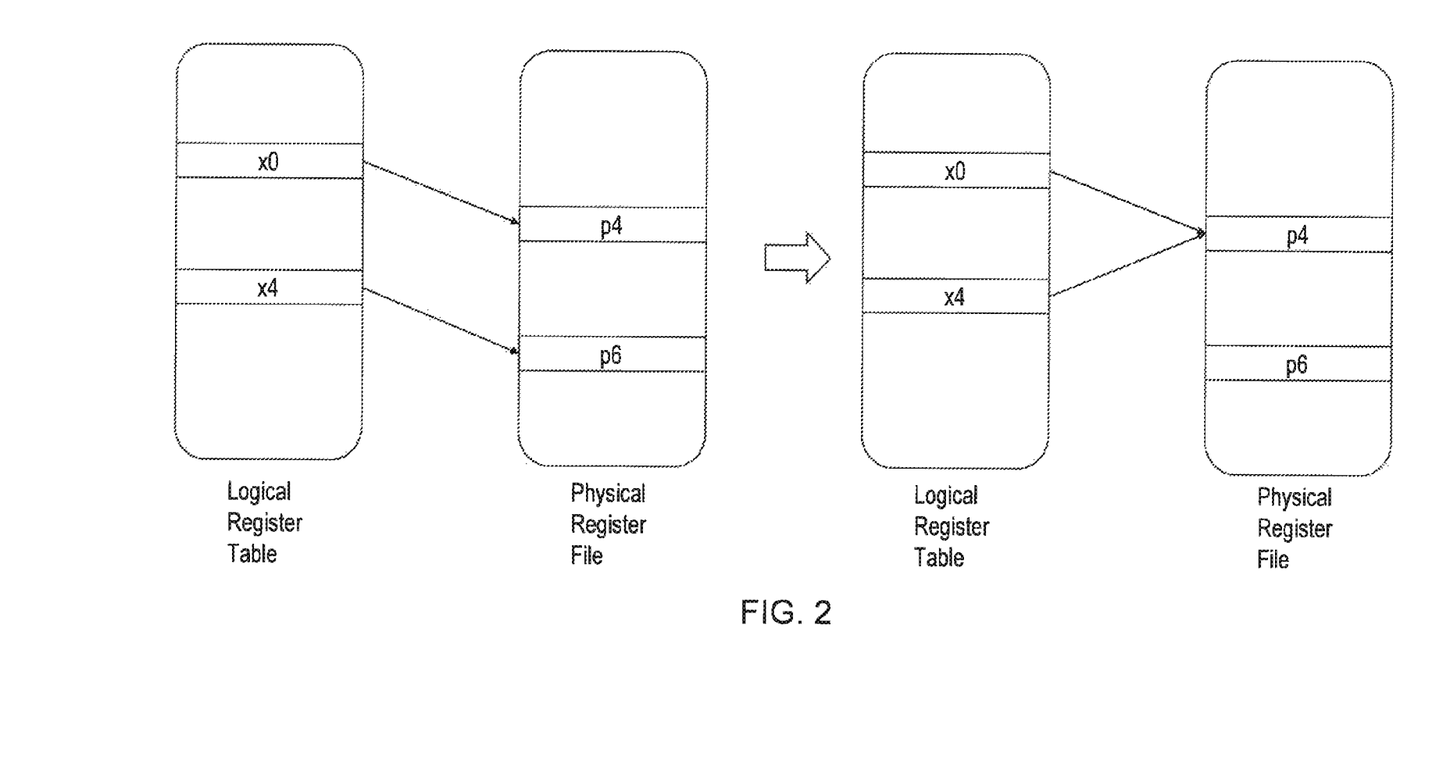
FIG. 2 shows the process of move elimination.

FIG. 2 illustrates the process of move elimination. A move instruction (MOV) copies data from one source to another—typically from one register to another. For instance, the move instruction mov p4 p5 causes data stored in register p5 to be copied to register p4. Traditionally, this operation can be performed by the ALU execution unit 160a by treating the instruction as an add zero instruction (e.g. p4=p5+0). Of course, such an operation utilises power and bandwidth as a consequence of the operation being performed by the ALU and so the overall throughput of instructions through the pipeline can be reduced.

Move elimination recognises that when register renaming is available, there is no need for the data in one register to be physically copied. Instead, one can simply update the mapping between logical and physical registers. For instance, as shown in the left side on FIG. 2, the logical register x0 initially points to a physical register p4 and a logical register x4 initially points to a physical register p6. A move instruction mov p4 p6 is then performed. This can be achieved by copying the data from p6 to p4 (e.g. using an add operation as described above). However, a faster way to do this is simply cause the logical register x4 to point to the physical register p4 by updating the logical register table (shown on the right side of FIG. 2). This does not require the use of any of the execution units 150 and so the average instruction execution rate is increased.

Figure 3:
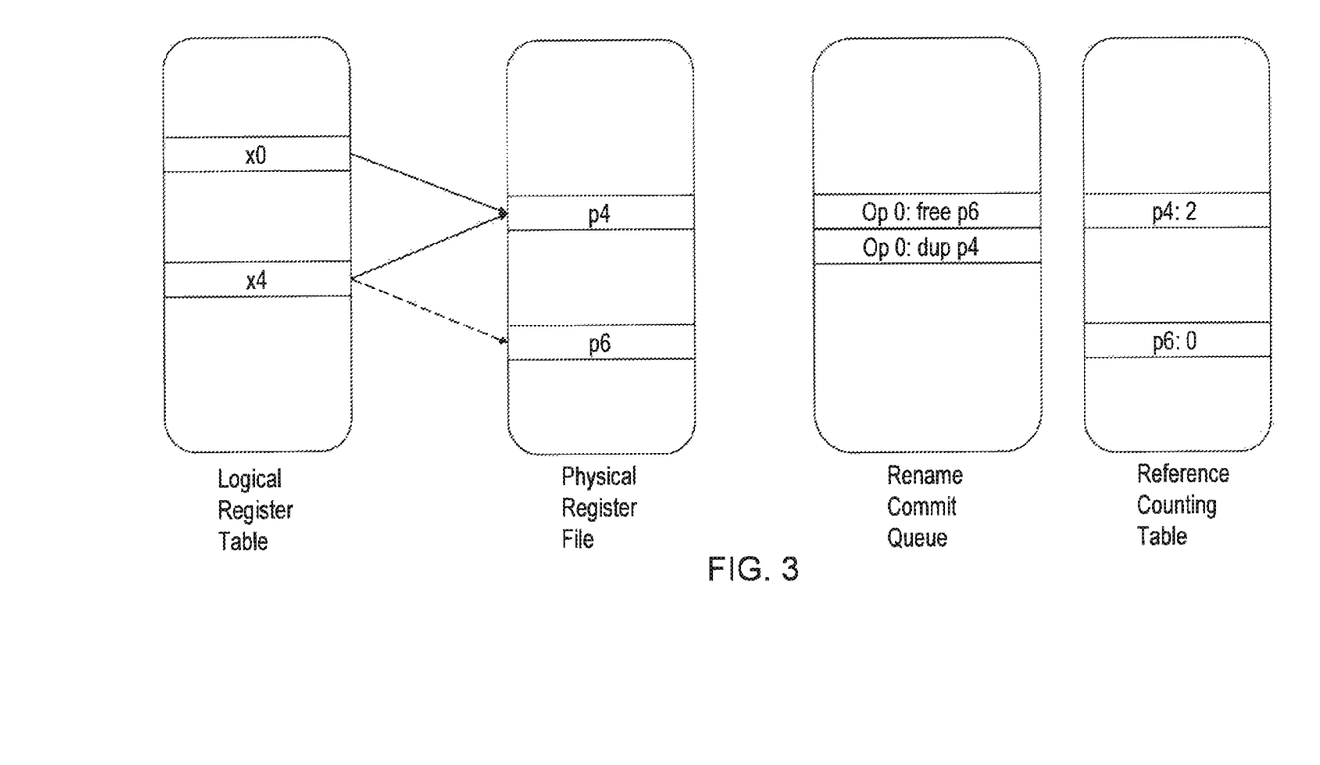
FIG. 3 gives an example of changing resource usage as a consequence of move elimination.

In practice, the use of move elimination is not free. As shown in FIG. 3, the move elimination illustrated in FIG. 2 necessitates two entries to be stored in the Rename Queue (RCQ) for a single move operation. The RCQ is used during the commit phase of instructions and is also used in the event of a pipeline flush in order to 'rewind' the instruction stream. Also as shown in FIG. 3, it may be necessary to perform reference counting to make sure that the physical register (p4) is not reclaimed until both of the logical registers (x0 and x4) finish using that physical register. Hence, an entry is stored in a Reference Counting Table to indicate that two logical registers refer to physical register p4 and zero logical registers refer to p6. Physical register p6 is therefore such that it can be reclaimed. When one of the logical registers stops referring to register p4 (e.g. if the value is changed) then the reference count for p4 in the Reference Counting Table can be reduced.

It is therefore clear that move elimination can decrease the usage of certain resources at the cost of increasing usage of other resources. It is therefore desirable to allow move elimination to be inhibited or prevented at certain points (or to reverse a move elimination that has already been performed).

Figure 4A:
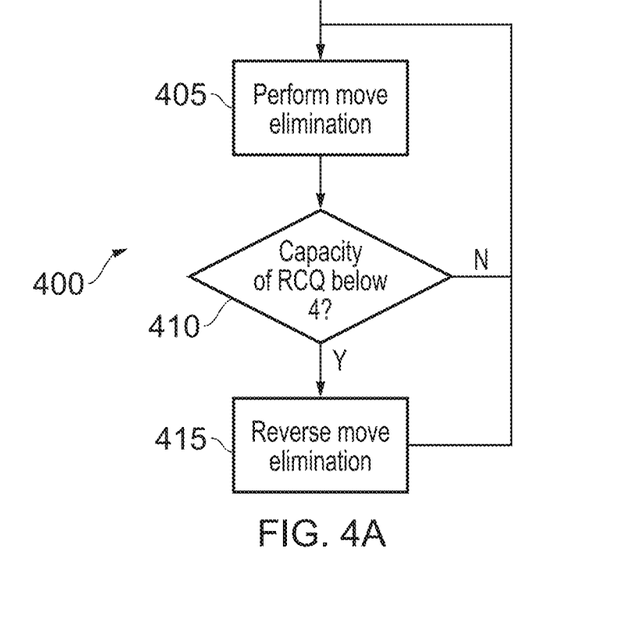
FIG. 4A shows an example of conditions that affect the performance of move elimination.

FIG. 4A illustrates, in the form of a flow chart 400, one way in which this can be achieved. At a step 405, move elimination is performed. At a step 410, it is determined whether a current remaining capacity of the RCQ is below some threshold (e.g. four entries). If so, then at step 415, in order to prevent further entries of the RCQ from being used, the move elimination is reversed. Otherwise, no action is taken. Of course, it will be appreciated that the same considerations can be taken into account for preventing move elimination from taking place initially, provided the conditions are tested for before the move elimination is applied.

Figure 4B:
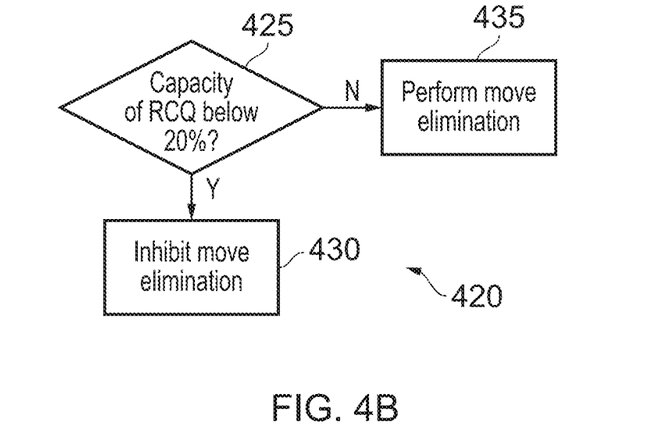
FIG. 4B shows an example of conditions that affect the performance of move elimination.

FIG. 4B illustrates, in the form of another flowchart 420, another set of considerations. Here, at a step 425, it is determined whether a capacity of the RCQ is below a threshold in the form of a percentage capacity of the RCQ. Here, the example threshold given is 20%. If so, then the move elimination is inhibited at step 430 and otherwise, the move elimination is performed at step 435. As per the previous example, it will be appreciated that a move elimination that has already taken place could instead be reversed (e.g. by inserting the MOV operation into the stream and undoing the changes made in the rename circuitry).

Figure 4C:
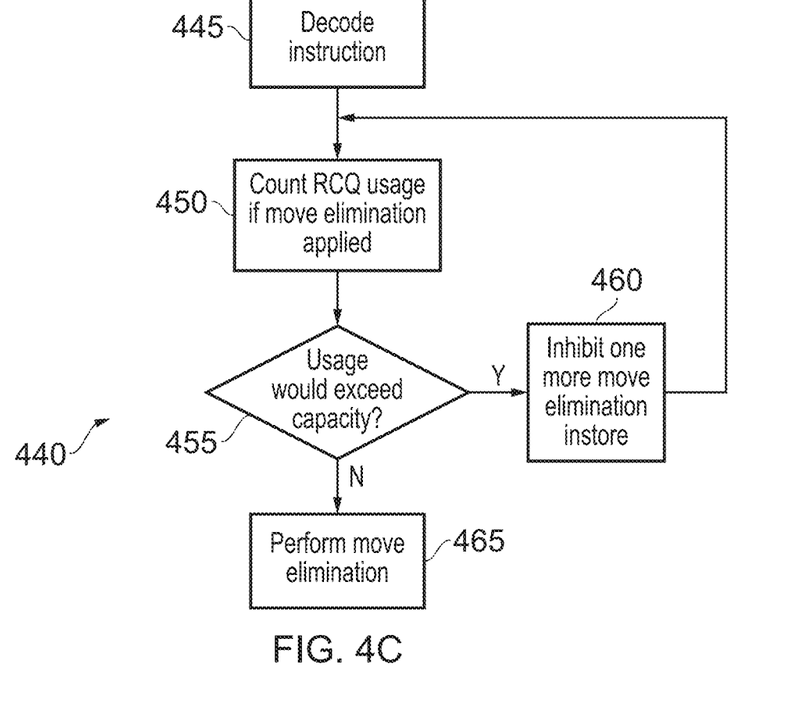
FIG. 4C shows an example of conditions that affect the performance of move elimination.

Both of these examples assume that the resource usage (e.g. the number of entries in the RCQ) is constant. However, this is not necessarily the case. Blockcode instructions are instructions in which a number of operations (or even a number of instructions) can be provided by a single instruction—either due to the complexity of the instruction in question or because of, e.g. compression. For instance, a blockcode instruction could refer to a number of registers (or even memory) where further instructions or encoded operations are found, that are to be executed. In these cases, the number of move operations that result could be much larger. With each move operation using numerous resources (e.g. two entries of an RCQ), this could result in a single instruction using up very large numbers of resources. In FIG. 4C, the flowchart 440 shows a method in which the actual resource usage of an instruction can be taken into account. At a step 445, an instruction is decoded (e.g. by the decode circuitry 120). The instruction can be analysed in order to determine, at step 450, the quantity of resources that are used by the instruction. At a step 455, it is determined whether this resource usage would cause the current remaining resources (e.g. the capacity of the RCQ) to be exhausted. If so, then at step 460, a further move operation caused by the instruction is inhibited from move elimination. Otherwise, the move elimination is performed at step 465. An example of a blockcode instruction is a vector move instruction, which corresponds to a vector move operation. This operation can copy multiple register values to its destination(s).

The flowchart 440 of FIG. 4C also shows an optional feedback loop. Here, after having inhibited one of the move operations from being subject to move elimination in step 460, the resource counting is again performed at step 450. Then, at step 455, if the new resource usage would still cause the capacity to be exceeded, then further move operations are inhibited at step 460 and re-testing occurs. Otherwise, move elimination occurs for the remaining operations at step 465. In this way, move elimination is prevented for as many of the move operations as is necessary.

Figure 4D:
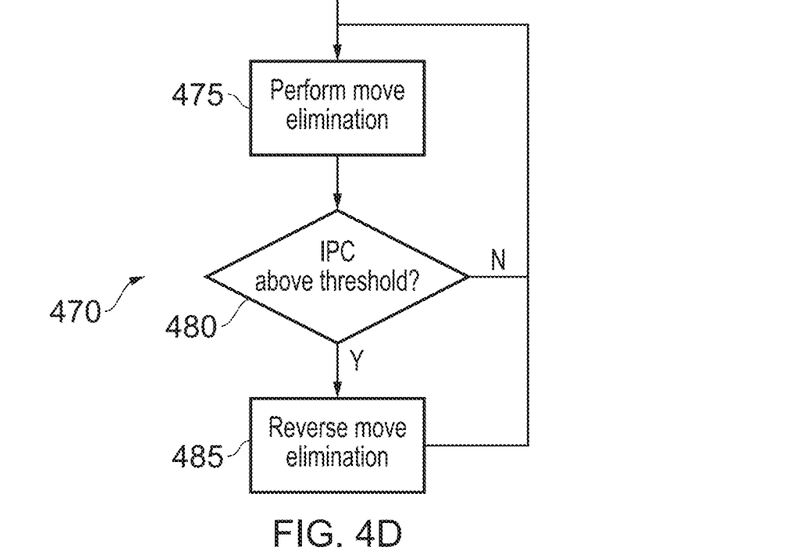
FIG. 4D shows an example of conditions that affect the performance of move elimination.

Another consideration is the number of Instructions per Cycle (IPC), which is an average of the number of instructions that are executed per processor cycle. In this example, it is assumed that if the IPC is low, then usage of resources such as the RCQ is also likely to be low and there may be a desire for the IPC to be improved. Consequently, suppression or inhibition of move elimination can be stopped, in order to improve the throughput of instructions through the pipeline (rather than having to rely on move operations taking place by the use of ALU operations for instance). The flowchart 470 begins at a step 475 where move elimination is performed. Then a step 480, it is determined whether the IPC is above a particular threshold. If not, then no further action is taken. Otherwise, at step 485, the move elimination is reversed. As per previous examples, the same considerations can also be used in a situation where move elimination is inhibited/suppressed or allowed (e.g. as shown in FIG. 4C) rather than being reversed after the fact.

Figure 5:
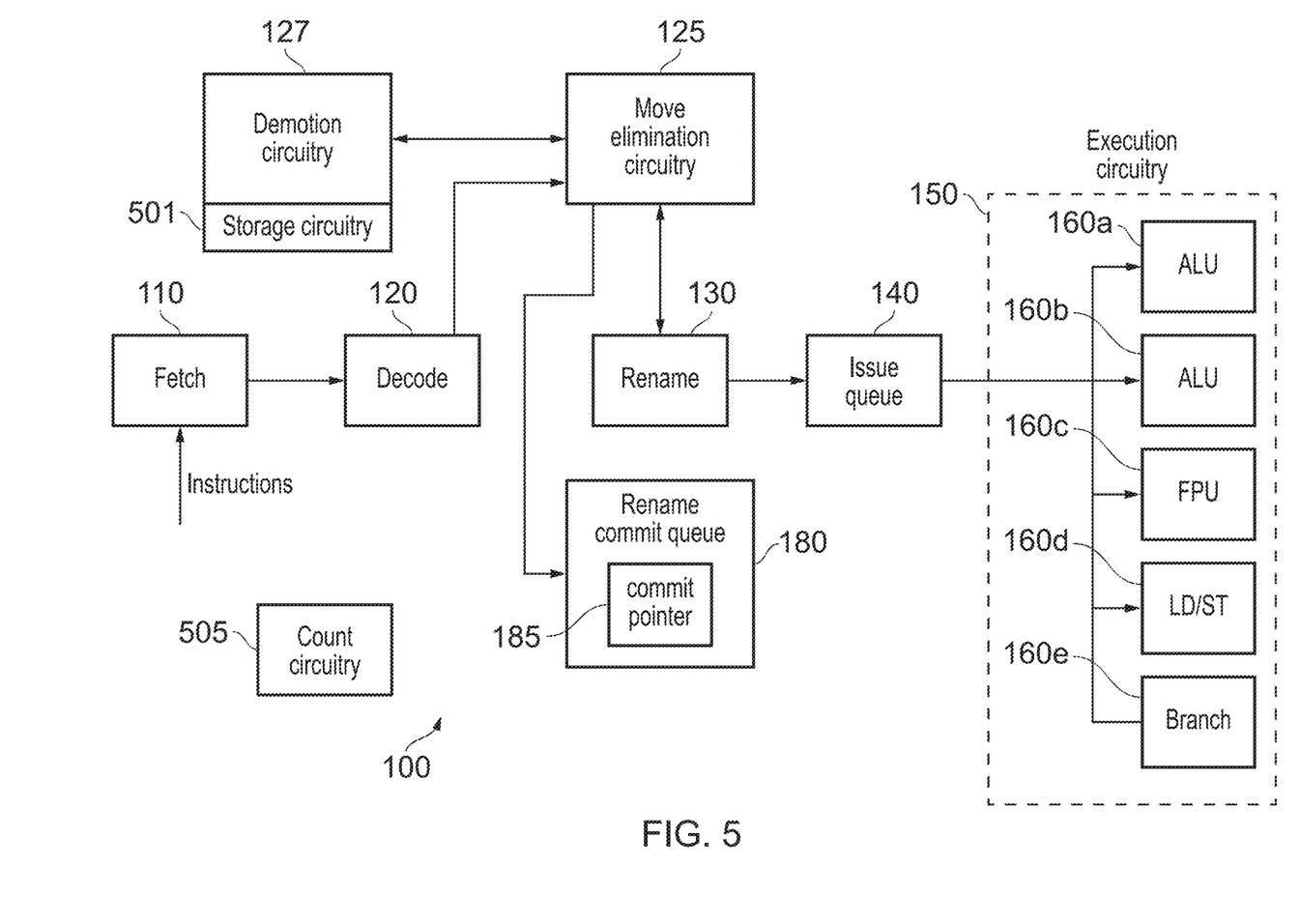
FIG. 5 schematically illustrates an example of a data processing apparatus.

FIG. 5 shows an example of the apparatus 100 in which count circuitry 505 has been provided in order to determine the IPC. The IPC could be calculated by measuring a specific part of the pipeline such as at a writeback stage (not shown) or at the instruction fetch stage 110.

FIG. 5 also shows storage circuitry 501 (e.g. a register), which is associated with the demotion circuitry 127. The storage circuitry can be used for storing a flag that can be used to indicate a mode in which the demotion circuitry 127 is to operate. For instance, the flag could represent a latency-improvement flag that indicates that latency of the pipeline is to be reduced—in which case move elimination should take place or that latency of the pipeline should not be reduced—in which case move elimination is reversed or inhibited. There are a number of ways in which such a flag might be set. These could include architectural or micro-architectural goals. One example in which latency reduction might be sought is in a real-time system where instructions must be responded to quickly, or in the handling of an exception or interrupt for instance. In other situations, power might be taken into consideration—for instance if the apparatus is operating in a 'high power' or 'processor boost' mode then it might be desirable to reduce the latency of the pipeline. Another situation in which this might be set is based on clues stored in the instruction stream (e.g. as generated by a compiler). For instance, if a programmer has indicated in a program that a particular block of code is non-critical then the compiler might use this as an opportunity to insert a hint into the instruction stream to set the flag to indicate that latency reduction need not take place (or vice-versa). Such a hint could take the form of a special instruction that is decoded to set the relevant flag in the storage circuitry 501. Other possibilities will be known to the skilled person.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   rename circuitry configured to perform a register rename stage of a pipeline in respect of a stream of operations;
   move elimination circuitry configured to perform a move elimination operation on the stream of operations in which a move operation is eliminated and the register rename stage performs an adjustment of an identity of logical registers in the stream of operations to compensate for the move operation being eliminated; and
   demotion circuitry configured to reverse or inhibit the adjustment in response to one or more conditions being met, wherein
   at least one of the one or more conditions relates to a current remaining capacity of a Rename Commit Queue used to indicate, for at least some of the operations, how a physical register is used in terms of whether it is allocated, duplicated, or freed from the logical registers.

2. The data processing apparatus according to claim 1, wherein
   the demotion circuitry is further configured to restore the move operation in response to the one or more conditions being met.

3. The data processing apparatus according to claim 1, wherein
   the demotion circuitry is configured to reverse or inhibit the adjustment based on a measure of Instructions per Cycle of the data processing apparatus.

4. The data processing apparatus according to claim 3, comprising:
   decode circuitry configured to decode a stream of instructions to produce the stream of operations that correspond to the stream of instructions, wherein
   the demotion circuitry is configured to inhibit the adjustment in response to the decode circuitry decoding a particular instruction into one or more particular operations including the move operation.

5. The data processing apparatus according to claim 4, wherein
   the at least one of the one or more conditions is that the one or more particular operations would cause the capacity of the Rename Commit Queue to be exceeded when the move operation is eliminated.

6. The data processing apparatus according to claim 4, wherein
   the particular instruction is a blockcode instruction comprising a plurality of further instructions in an encoded form; and
   the demotion circuitry is configured to inhibit the adjustment based on how the current remaining capacity of a Rename Commit Queue is affected by the plurality of further instructions in the encoded form.

7. A data processing method comprising:
   performing a register rename stage of a pipeline in respect of a stream of operations;
   performing a move elimination operation on the stream of operations in which a move operation is eliminated and the register rename stage performs an adjustment of an identity of logical registers in the stream of operations to compensate for the move operation being eliminated; and
   reversing or inhibiting the adjustment in response to one or more conditions being met, wherein
   at least one of the one or more conditions relates to a current remaining capacity of a Rename Commit Queue used to indicate, for at least some of the operations, how a physical register is used in terms of whether it is allocated, duplicated, or freed from the logical registers.

8. A non-transitory computer-readable medium to store computer-readable code for fabrication of a data processing apparatus comprising:

rename circuitry configured to perform a register rename stage of a pipeline in respect of a stream of operations;

move elimination circuitry configured to perform a move elimination operation on the stream of operations in which a move operation is eliminated and the register rename stage performs an adjustment of an identity of logical registers in the stream of operations to compensate for the move operation being eliminated; and demotion circuitry configured to reverse or inhibit the adjustment in response to one or more conditions being met, wherein at least one of the one or more conditions relates to a current remaining capacity of a Rename Commit Queue used to indicate, for at least some of the operations, how a physical register is used in terms of whether it is allocated, duplicated, or freed from the logical registers.

* * * * *